United States Patent
Alfonso Alegre et al.

(10) Patent No.: US 12,297,353 B2
(45) Date of Patent: May 13, 2025

(54) RECYCLABLE, SEALABLE CONTAINER

(71) Applicant: SOCIEDAD ANÓNIMA MINERA CATALANO ARAGONESA, Saragossa (ES)

(72) Inventors: Maria José Alfonso Alegre, Saragossa (ES); Patricia Zagalaz Lasierra, Saragossa (ES); Miguel Angel Caballero Lopez, Saragossa (ES)

(73) Assignee: SOCIEDAD ANÓNIMA MINERA CATALANO ARAGONESA, Saragossa (ES)

( * ) Notice: Subject to any disclaimer, the term of this patent is extended or adjusted under 35 U.S.C. 154(b) by 386 days.

(21) Appl. No.: 17/788,628

(22) PCT Filed: Jan. 20, 2020

(86) PCT No.: PCT/ES2020/070040
§ 371 (c)(1),
(2) Date: Jun. 23, 2022

(87) PCT Pub. No.: WO2021/148685
PCT Pub. Date: Jul. 29, 2021

(65) Prior Publication Data
US 2023/0039785 A1  Feb. 9, 2023

(51) Int. Cl.
*C08L 77/06* (2006.01)
*B65D 65/38* (2006.01)

(52) U.S. Cl.
CPC ............. *C08L 77/06* (2013.01); *B65D 65/38* (2013.01); *C08L 2201/14* (2013.01)

(58) Field of Classification Search
CPC ...... C08L 77/06; C08L 2201/14; B65D 65/38
See application file for complete search history.

(56) References Cited

U.S. PATENT DOCUMENTS

| | | |
|---|---|---|
| 4,939,076 A | 7/1990 | Mueller |
| 5,480,690 A | 1/1996 | Stenger et al. |
| 2009/0163634 A1 | 6/2009 | Buhler et al. |
| 2012/0228182 A1 | 9/2012 | Ting |
| 2017/0320301 A1 | 11/2017 | Dederichs et al. |

FOREIGN PATENT DOCUMENTS

| | | | |
|---|---|---|---|
| EP | 0397767 A1 | 11/1990 | |
| EP | 0826731 * | 4/1998 | ............ C08L 77/00 |
| EP | 2463078 A1 | 6/2012 | |
| EP | 2682252 A1 | 1/2014 | |
| ES | 2077110 T3 | 11/1995 | |
| ES | 2109533 T3 | 1/1998 | |
| ES | 2160192 T3 | 11/2001 | |
| ES | 2292743 T3 | 3/2008 | |
| ES | 2324914 T3 | 8/2009 | |
| ES | 2586652 T3 | 10/2016 | |
| JP | 2000109689 A | 4/2000 | |
| KR | 100698375 B1 | 3/2007 | |

OTHER PUBLICATIONS

Lai, C.-C. et al. "Preparation and characterization of heterocyclic polyamide 6 (PA 6) with high transparencies and low hygroscopicities". Journal of Molecular Structure 2019, vol. 1175, pp. 836-843. [Available online Jul. 8, 2018]. DOI: 10.1016/j.molstruc.2018. 08.032. ISSN: 0022-2860. [Retrieved Feb. 10, 2020]. Retrieved from: <https://doi.org/10.1016/j .molstruc.2018.08.032, retrieved Jun. 23, 2022.
International Search Report for corresponding PCT application No. PCT/ES2020/070040, mailed Oct. 8, 2020.

* cited by examiner

*Primary Examiner* — Michael C Miggins
(74) *Attorney, Agent, or Firm* — Notaro, Michalos & Zaccaria P.C.

(57) ABSTRACT

A recyclable, sealable packaging that has one or several polyamides, in a proportion greater than or equal to 90% by weight with respect to the total, and the sealing layer consists of one or several polyamides that are sealable at less than 200° C. is disclosed. The invention affords the main advantages of being recyclable after its use and having a sufficiently low melting temperature for it to seal with itself and with other polyamides.

6 Claims, No Drawings

RECYCLABLE, SEALABLE CONTAINER

This description relates, as its title indicates, to a sealable packaging which comprises one or several polyamides in a proportion greater than or equal to 90% by weight with respect to the total, and in which the sealing layer consists of one or more polyamides that are sealable at less than 200° C., allowing recycling thereof after use.

FIELD OF THE INVENTION

The invention relates to the field of recyclable packagings, especially those that are sealable.

CURRENT STATE OF THE ART

At present, packagings made of plastic materials are widely used, and specifically in the case of the food industry some of them require an oxygen barrier to extend the shelf life of foodstuffs and certain mechanical properties (such as breaking strength and resistance to tear or puncture), and slip, or transparency and gloss properties. To achieve these properties most of these packagings have a multi-layer structure, normally with a minimum of 5 layers:
- an outer layer (furthest away from the packaging contents) of polyethylene, as a moisture barrier,
- an intermediate layer of modified polyethylene, as adhesive between the outer layer of polyethylene and the intermediate layer of polyamide,
- an intermediate layer of polyamide, as a gas barrier, also providing mechanical properties,
- an intermediate layer of modified polyethylene, as an adhesive between the inner layer of polyethylene and the intermediate layer of polyamide, and
- an outer layer (nearest to the packaging contents) of polyethylene, as a moisture barrier, and that is usually the sealing layer.

Structures of 7 layers or more are also known, for example, when a higher oxygen barrier than that provided by polyamide is required, where it is necessary to use EVOH (ethylene-vinyl-alcohol):
- an outer layer (nearest to the packaging contents) of polyethylene, as a moisture barrier,
- an intermediate layer of modified polyethylene, as adhesive between the outer layer of polyethylene and the intermediate layer of polyamide,
- an intermediate layer of polyamide, which provides mechanical properties,
- a layer of EVOH which provides the oxygen barrier,
- an intermediate layer of polyamide, which provides mechanical properties,
- an intermediate layer of modified polyethylene, as an adhesive between the inner layer of polyethylene and the intermediate layer of polyamide,
- an outer layer (nearest to the packaging contents) of polyethylene, as a moisture barrier, and that is usually the sealing layer.

This type of multi-layer structures is described, for example, in patents U.S. Pat. No. 4,939,076 "Barrier stretch film", U.S. Pat. No. 5,480,690 "Multi-layer polyamide-based packaging casing", ES2109533 "Barrier layers made of transparent polyamide", and JP2000109689 "Copolyimide film", which allow to add the effects of the different materials, achieving a very effective packaging that is widely used but with the serious problem that the recycling of these packagings after use is very difficult and costly since it is almost impossible to separate the layers of the different materials after production of the packaging, normally by extrusion.

Packagings for which gas permeability is required to allow gases to exit are also known, such as those described in ES2292743 "Wrapping film for foods" and ES2324914 "Tubular or flat smokable food sheet or casing for food packagings, and production method thereof", which tend to consist of a mix of plastic materials that sometimes contain a small proportion of polyamide and due to the mix, as in the previous case, this prevents them from being recycled.

Furthermore, if the packaging must have the characteristic of sealing with itself or with other similar materials, such as for example, when in the form of a film, this requires multi-layer structures in which one of the polyethylene layers can be used for the sealing function, as is described for example in KR100698375 "Multiple Layer film for Packaging Food", which makes its later recycling even more difficult.

Packagings in which a high percentage of polyamide is used are also known, such as those used for paste-like substances to prevent the foodstuffs from adhering to the packaging, as is claimed in ES2077110 "Tubular structure multi-layer wrapping" and ES2160192 "Polyamide casing for sausages with enhanced peeling characteristic" This type of packaging employs polyamides with a high melting temperature, preventing it from having a sealing capacity, so that that it has to be sealed by welding, riveting or by metal or plastic closing clips. Some of these packagings, such as that described in ES2586652 "Biaxially-oriented, multi-layer, sealable tubular film for the packaging and wrapping of meat, meat with bones, and paste-like foodstuffs and use thereof", indicate the possibility of using a sealable polyamide, but in a total percentage that is considerably lower than 90%, which thus prevents its correct identification and the possibility of industrial separation to allow its reuse.

At present there is no known packaging that contains 90% or more polyamides, in which the sealing layer is a polyamide with a sealing temperature of less than 200° C. that is easy to recycle, and that presents the desired properties of gas permeability, especially oxygen and $CO_2$ permeability, combined with the property of sealing with itself or with other polyamides, as well as excellent optical and mechanical properties such as breaking strength, resistance to puncture, tear or impacts.

DESCRIPTION OF THE INVENTION

To solve the problems that currently exist in regard to the recycling of films and packagings consisting of several layers of different materials, the recyclable, sealable packaging has been devised, which comprises:
- one or several polyamides in a proportion greater than or equal to 90% by weight with respect to the total, preferably 95%, and more preferably 100%, and
- other polymers, different to the said polyamides, inks and/or additives, in a proportion less than or equal to 10% by weight with respect to the total.

The sealing layer consists of one or several polyamides that seal at less than 200° C. and results in a reusable composition since it is identifiable and selectively separable from other plastic wastes. Identification and selective separation from other wastes is carried out by means of suitable technologies, such as, for example, infrared technology.

To achieve these properties of being identifiable, selectively separable and hence reusable, it is important that the percentage of polyamide is as high as possible, ideally 100%, although, due to technical requirements of the packaging, this percentage can be reduced, and up to 10% of other materials can be incorporated without this significantly lessening the said properties.

This composition is applicable both to single-layer packagings, in which case the sealing layer is considered to be the only layer that exists, and to multi-layer packagings, in which case the sealing layer is considered to be one of the outer layers.

This composition achieves a sufficiently low melting temperature for it to seal with itself and with other polyamides. It also allows the use of various types of polyamide, obtaining, by means of its preferred embodiment, a packaging with a lower oxygen permeability than that of standard PA6 or Nylon 6 polyamide, thus achieving a better oxygen barrier effect and also obtaining, by means of its alternative embodiment, a packaging with a notably higher oxygen and $CO_2$ permeability than that of standard PA6 or Nylon 6 polyamide, this way achieving a better gas permeability effect and allowing great adaptability to packaging needs.

This packaging, which has been described, has a characteristic use in food applications, especially in the manufacture of films, bags, trays and other types of containers.

Advantages of the Invention

This recyclable, sealable packaging that is presented affords numerous advantages over those currently available, the most important one being that, as it contains at least 90% polyamide, this allows its identification, separation (for example by FTIR technology) and its recycling after use.

Another advantage of this invention is that the sealing layer of the packaging has a sufficiently low melting temperature to enable it to seal with itself or with other polyamides thanks to the choice of adequate monomers for the polyamide present in the sealing layer and to its production in an adequate polymerisation process that favours a random rather than block arrangement, which reduces the crystallinity of the polyamide.

Another important advantage to be highlighted is that the polyamides used have good processing properties in film and sheet and very interesting mechanical and gas barrier or gas permeability properties for the production of different types of food use packaging.

Also noteworthy is its excellent breaking strength and deformation, and high tear and puncture resistance, which enhances its use as packaging for foods with bones, or for very deep trays.

Another important advantage is that, in its preferred embodiment, this packaging presents a gas barrier effect, especially against oxygen, higher than most commercial polyamides, this being of particular interest for foodstuffs that spoil by oxidation in the presence of oxygen.

It is also important to highlight that, in its alternative embodiment, this packaging has a high gas permeability, especially to oxygen and CO2, higher than most commercial polyamides, this being of particular interest for foodstuffs that generate gases during their storage, such as for example cheese, which generates $CO_2$ when it matures in its packaging.

PREFERRED EMBODIMENT OF THE INVENTION

The constitution and features of the invention may be better understood from the following description, in which we specify that the recyclable, sealable packaging comprises:

one or several polyamides in a proportion greater than or equal to 90% by weight with respect to the total, preferably 95%, and more preferably 100%, and other polymers, different to the said polyamides, inks and/or additives, in a proportion less than or equal to 10% by weight with respect to the total, the sealing layer consisting of one or several polyamides that seal at less than 200° C. and resulting in an identifiable composition, selectively separable from other plastic waste and thus reusable. Identification and selective separation from other wastes is carried out by means of suitable technologies, such as, for example, infrared technology.

To achieve these properties of being identifiable, selectively separable and hence reusable, it is important that the percentage of polyamide is as high as possible, ideally 100%, although, due to technical requirements of the packaging, this percentage can be reduced, and up to 10% of other materials can be incorporated without this significantly lessening the said properties.

This composition is applicable both to single-layer packagings, in which case the sealing layer is considered to be the only layer that exists, and to multi-layer packagings, in which case the sealing layer is considered to be one of the outer layers.

This composition achieves a sufficiently low melting temperature for it to seal with itself and with other polyamides. In particular, for a thickness of 50 microns, sealing is obtained at a temperature of less than 200° C., preferably less than 160° C. and more preferably less than 140° C. The seal strength thus obtained is greater than 18 MPa.

The sealable polyamide or polyamides are manufactured, preferably but not exclusively, from monomers such as adipic acid, isophthalic acid, terephthalic acid, azelaic acid, sebacic acid, undecanedioic acid, dodecanedioic acid, tetradecanedioic acid, pentadecanedioic acid, hexadecanedioic acid, tetramethylenediamine, hexamethylenediamine, isophoronediamine, 1,5-pentanediamine, xylylenediamine, caprolactam, laurolactam, omega-aminoundecanoic acid, etc.

The other polymers, different to the said polyamide are chosen from the group formed by ethylene-vinyl-alcohol, (EVOH), polyethylene (LDPE, LLDPE, mLLDPE, MDPE, HDPE), modified polyethylene, polypropylene (PP), modified polypropylene, polyethylene terephthalate (PET, PETG, CPE), polyvinyl chloride (PVC), polystyrene (PS), ionomers, ethylene vinyl acetate (EVA), ethylene butyl acetate (EBA), cyclic olefin copolymer (COC), AlOx, SiOx or a combination of them.

In a preferred embodiment of the recyclable, sealable packaging, the polyamide comprises meta-xylylenediamine in a proportion greater than or equal to 5%, preferably between 5% and 30% by weight with respect to the total, isophthalic acid also known as IPA and/or terephthalic acid also known as PTA, in such a way that the sum of the contents of both is greater than or equal to 3%, preferably in a proportion of between 3% and 18% by weight with respect to the total, and caprolactam in a proportion less than or equal to 89%, preferably in a proportion of between 34% and 89% by weight with respect to the total.

This composition achieves an oxygen permeability of less than 15 cc/m$^2$/day, measured at 3° C. and 50% humidity, preferably less than 11 cc/m2/day, and more preferably less than 8 cc/m2/day, for a thickness of 50 microns, which is therefore lower than that of standard PA6 or Nylon 6 polyamide that presents a permeability of between 15 and 20 cc/m²/day in the same conditions, thus achieving a better oxygen barrier effect.

In an alternative embodiment of the recyclable, sealable packaging, the polyamide comprises hexamethylenediamine in a proportion greater than or equal to 5%, preferably in a proportion of between 5% and 30% by weight with respect to the total, dodecanedioic acid in a proportion greater than or equal to 10%, preferably in a proportion of between 10% and 60% by weight with respect to the total, and caprolactam in a proportion less than or equal to 85%, preferably in a proportion of between 10% and 85% by weight with respect to the total, This composition achieves an oxygen permeability greater than 20 cc/m²/day, measured at 23° C. and 50% humidity, preferably greater than 30 cc/m²/day, and more preferably greater than 50 cc/m²/day, for a thickness of 50 microns, which is therefore higher than that of standard PA6 or Nylon 6 polyamide that presents a permeability of between 15 and 20 cc/m²/day in the same conditions, thus obtaining better oxygen permeability. Likewise, it achieves a $CO_2$ permeability greater than 105 cc/m²/day, preferably greater than 200 cc/m²·day, measured at 23° C. and 0% humidity, for a film thickness of 50 microns, which is therefore higher than that of standard PA6 o Nylon 6 polyamide that presents a permeability of between 95 and 105 cc/m²/day in the same conditions, thus obtaining better $CO_2$ permeability.

This recyclable, sealable packaging described has a characteristic use in food applications, in particular, in the production of vacuum packaging, skin packaging, shrink packaging, bags, and also trays, lids and other types of containers. Its use as packaging for non-food applications is also characteristic and possible.

To achieve the described result various experimental trials have been conducted, among which the following are highlighted:

Gas Permeability

Based on the composition indicated in the preferred embodiment, measurements have been made in films with a thickness of 50 microns, verifying that their gas permeability, both to oxygen and carbon dioxide $CO_2$, is lower in all cases than the standard PA6 polyamide, thus exhibiting a better gas barrier effect.

TABLE 1

| | Oxygen permeability (cc/m²/day) | | $CO_2$ permeability (cc/m²/day) |
|---|---|---|---|
| | 23° C. 50% relative humidity | 23° C. 85% relative humidity | 23° C. 0% relative humidity |
| PA6 (Nylon 6) polyamide | 15-20 | 35-50 | 95-105 |
| Recyclable, sealable packaging | 5-11 | 20-30 | 80-90 |

With the composition indicated in the alternative embodiment, measurements have also been made in films with a thickness of 50 microns, verifying that their gas permeability, both to oxygen and carbon dioxide $CO_2$, is higher in all cases than the standard PA6 polyamide, thus exhibiting a better gas permeability effect.

TABLE 2

| | Oxygen permeability (cc/m²/day) | | $CO_2$ permeability (cc/m²/day) |
|---|---|---|---|
| | 23° C. 50% relative humidity | 23° C. 85% relative humidity | 23° C. 0% relative humidity |
| PA6 (Nylon 6) polyamide | 15-20 | 35-50 | 95-105 |
| Recyclable, sealable packaging | 50-90 | 100-130 | 265-275 |

Melting Temperature

Based on the composition indicated in the preferred embodiment, in a Differential Scanning calorimetry (DSC) test in which a sample of pellets of the compound is heated at a speed of 10° C./min to 250° C., at least one endothermic peak should appear at a temperature lower than or equal to 205° C., preferably lower than or equal to 185° C. An endothermic peak=Peak value: 183° C., Endset: 189° C. is obtained With the composition indicated in the alternative embodiment and in the same previous conditions and requirements, an endothermic peak=Peak value: 160° C., Endset: 172° C. is obtained.

A person skilled in the art will easily comprehend that the characteristics of different embodiments can be combined with the characteristics of other possible embodiments, provided that the combination is technically possible.

All of the information referring to examples or embodiments form part of the description of the invention.

The invention claimed is:

1. A recyclable, sealable packaging, comprising:
   one or several polyamides in a proportion greater than or equal to 90% by weight with respect to a total weight of the packaging,
   other polymers, different to the said one or several polyamides, in a proportion less than or equal to 10% by weight with respect to the total weight of the packaging, and
   a sealing layer consisting of a polyamide that seals at less than 200° C.;
   wherein the one or several polyamides comprises
   hexamethylenediamine in a proportion greater than or equal to 5% by weight with respect to the total weight of the packaging,
   dodecanedioic acid in a proportion greater than or equal to 10% by weight with respect to the total weight of the packaging, and
   caprolactam in a proportion less than or equal to 85% by weight with respect to the total weight of the packaging.

2. The recyclable, sealable packaging, according to claim 1, wherein the hexamethylenediamine is present in a proportion of between 5% and 30% by weight with respect to the total weight of the packaging.

3. The recyclable, sealable packaging, according to claim 1, wherein the dodecanedioic acid is present in a proportion of between 10% and 60% by weight with respect to the total weight of the packaging.

4. The recyclable, sealable packaging, according to claim 1, wherein the caprolactam is present in a proportion of between 10% and 85% by weight with respect to the total weight of the packaging.

5. The recyclable, sealable packaging, according to claim 1, having a composition with an oxygen permeability greater than 15 cc/m²/day, measured at 23° C. and 50% humidity, for a thickness of 50 microns.

6. The recyclable, sealable packaging, according to claim 1, having a composition with a CO2 permeability greater than 105 cc/m²/day, measured at 23° C. and 0% humidity, for a thickness of 50 microns.

\* \* \* \* \*